United States Patent [19]

Rowe

[11] Patent Number: 5,308,383
[45] Date of Patent: May 3, 1994

[54] METHOD FOR SEPARATING CHLORINE FROM A MIXTURE OF GASES

[75] Inventor: Edward A. Rowe, Grand Island, N.Y.

[73] Assignee: Occidental Chemical Corporation, Niagara Falls, N.Y.

[21] Appl. No.: 78,908

[22] Filed: Jun. 21, 1993

[51] Int. Cl.$^5$ .............................................. B01D 53/14
[52] U.S. Cl. ........................................ 95/182; 95/180; 95/233
[58] Field of Search .................. 95/180, 182, 211, 233

[56] References Cited

U.S. PATENT DOCUMENTS

| | | | |
|---|---|---|---|
| 2,282,712 | 5/1942 | Engs et al. | 95/182 X |
| 2,393,229 | 1/1946 | Bouchard | 95/233 X |
| 2,540,905 | 2/1951 | Neubauer et al. | 95/182 X |
| 2,656,011 | 10/1953 | Frey | 95/233 X |
| 2,765,873 | 10/1956 | Hulme | 95/182 |
| 3,488,923 | 1/1970 | Hutchinson | 95/182 |
| 3,762,133 | 10/1973 | Merriman et al. | 95/233 X |
| 4,255,167 | 3/1981 | Babb et al. | 95/233 |

FOREIGN PATENT DOCUMENTS

| | | | |
|---|---|---|---|
| 738797 | 7/1966 | Canada | 95/233 |
| 62-216902 | 9/1987 | Japan | 95/233 |
| 866002 | 4/1961 | United Kingdom | 95/233 |

Primary Examiner—Robert Spitzer
Attorney, Agent, or Firm—Wayne A. Jones; Richard D. Fuerle

[57] ABSTRACT

Disclosed is a method of removing chlorine from a mixture of gases. The mixture of gases is contacted with a liquid which contains a compound having the general formula

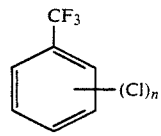

where n is 1 to 3, whereby chlorine in the mixture of gases is absorbed by the liquid. The liquid is then heated to volatilize the chlorine and separate it from the liquid.

13 Claims, 1 Drawing Sheet

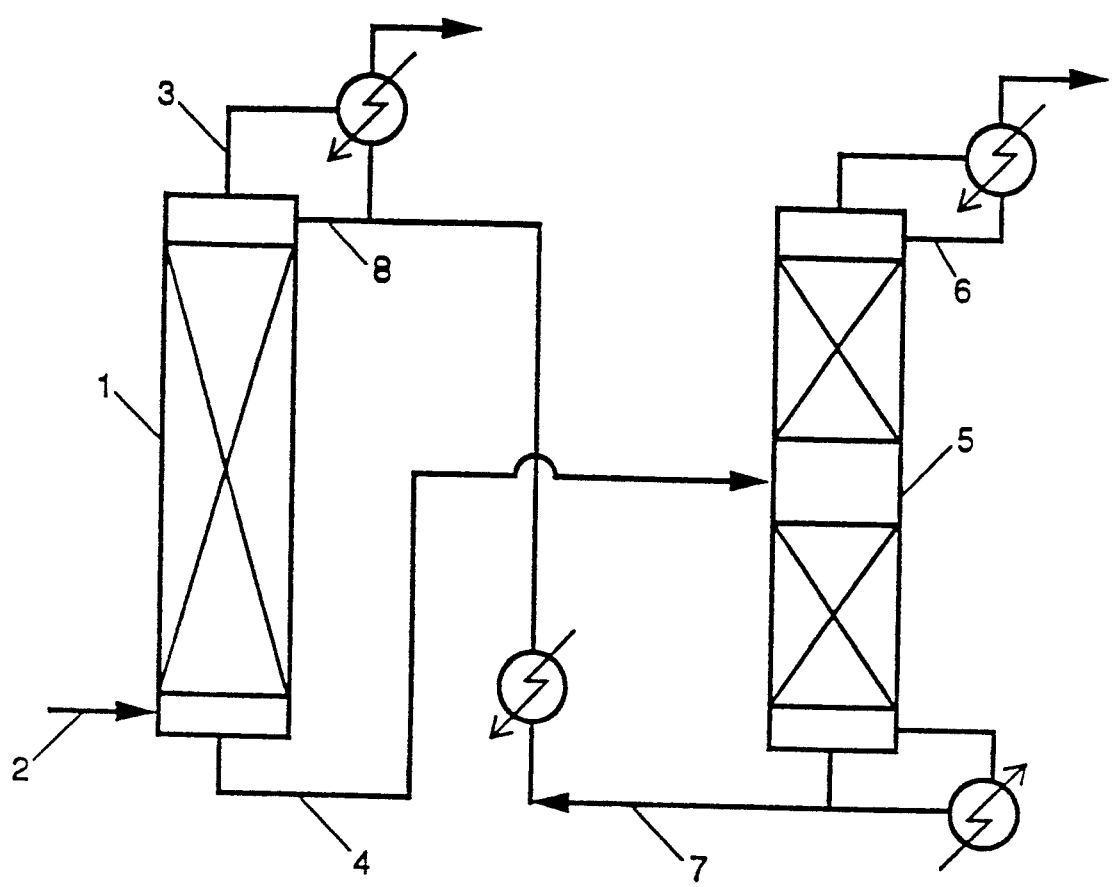

METHOD FOR SEPARATING CHLORINE FROM A MIXTURE OF GASES

BACKGROUND OF THE INVENTION

Chlorine is shipped as a pressurized liquid in tank cars. Customers use the chlorine by forcing it out of the tank cars with air pressure. When the tank cars are returned to the chlorine manufacturer, they are filled with air that contains some of the chlorine that was not removed. Gas mixtures that contain small amounts of chlorine and relatively harmless other gases also come from barges, plant vents, and other sources, and are known as "snift gases." Because snift gases contain chlorine they cannot be vented to the atmosphere.

At the present time, snift gases are passed through an absorber column where the gas contacts liquid carbon tetrachloride. The carbon tetrachloride absorbs the chlorine and the chlorine-free air is vented to the atmosphere. The carbon tetrachloride containing the absorbed chlorine is heated to vaporize the chlorine. The vaporized chlorine is liquified and recovered and the carbon tetrachloride, now free of chlorine, is recycled to the absorber column.

The problem with this chlorine recovery process is that small amounts of carbon tetrachloride vaporize and are vented to the atmosphere with the air. Because U.S. Government personnel have determined that carbon tetrachloride is an ozone depleter, the use of carbon tetrachloride as a chlorine absorber will no longer be permitted. Efforts are therefore underway to identify liquids that are good chlorine absorbers, but which are relatively non-volatile and are not ozone depleters.

SUMMARY OF THE INVENTION

I have discovered that certain chlorinated benzotrifluoride compounds possess heretofore unknown physical properties that make them particularly useful in absorbing chlorine from a mixture of gases. These properties include liquidity over a wide range of temperatures, high solubility for chlorine, non-reactiveness towards chlorine at the conditions of chlorine recovery, low fire hazard, non-ozone depleting and low viscosity. In addition, these chlorinated benzotrifluoride compounds have a higher boiling point than carbon tetrachloride, which reduces their emission to the atmosphere and leads to less contamination of the recovered chlorine. The only loss of the chlorinated benzotrifluoride compound to the atmosphere is expected to be about 0.3 lbs/hr per 3400 lbs/hr of snift gas (a 0.007 wt % loss). This is less than the loss incurred when chloroform is used.

While the half-life of carbon tetrachloride in the atmosphere is about 135 years, the half-life of the chlorinated benzotrifluoride compounds used in this invention is less than 100 days. Since it takes about two years for these compounds to go from the troposphere to the stratosphere, the compounds of this invention are not expected to be ozone depleters.

BRIEF DESCRIPTION OF THE DRAWING

The accompanying drawing is a diagram illustrating a certain presently preferred process according to this invention.

DESCRIPTION OF THE PREFERRED EMBODIMENTS

In the drawing, a snift gas containing chlorine and other gases enters the bottom of absorber column 1, through gas inlet 2. The snift gas passes up through the packing material (not shown) in the column (e.g., Berl saddles, rasaigh rings, etc.) where it encounters a chlorinated benzotrifluoride liquid according to this invention. The intimate contact between the snift gas and the liquid results in the absorption of the chlorine in the snift gas by the liquid. The remaining snift gas leaves column 1 through gas outlet 3, and the liquid containing the absorbed chlorine leaves column 1 through liquid outlet 4, where it is transported to stripper 5. In stripper 5, the liquid is heated by means not shown to vaporize the chlorine absorbed in the liquid. The vaporized chlorine passes out chlorine outlet 6 where it is collected and recycled to the chlorine manufacturing plant. The liquid, stripped of its chlorine, leaves stripper 5 through liquid outlet 7 and is recycled to absorber 1 through liquid inlet 8.

Snift gases that can be treated using the process and apparatus of this invention may contain any amount of chlorine. However, if the snift gas contains more than about 60 wt % chlorine, it is generally more economical to remove most of the chlorine by cooling and compressing the gas to liquefy the chlorine. Thus, a typical snift gas treated according to this invention will contain about 1 to about 45 wt % chlorine. Usually, the remainder of the gases in the snift gas have the composition of air, about 79% nitrogen and 19% oxygen.

Chlorinated benzotrifluoride compounds that are useful in this invention have the general formula

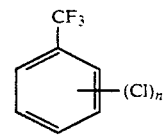

where n is 1 to 3. Preferably, n is 2 or 3, because those compounds are higher boiling and therefore less of the compound is lost to the atmosphere. Also, they are less flammable and more chemically stable.

It is preferable to begin absorbing the chlorine with a dichlorobenzotrifluoride compound such as 3,4-dichloro benzotrifluoride, which is a commercial product. As the 3,4-dichloro benzotrifluoride is used and reused, it very slowly reacts with the chlorine and forms 3,4,5-trichlorobenzotrifluoride. Therefore, much of the time the liquid will be a mixture of the dichloro- and trichlorobenzotrifluoride compounds. Tetrachloro- and pentachlorobenzotrifluoride compounds are not suitable because they are solids.

It may also be desirable to use a mixture of the chlorinated benzotrifluoride compound with another liquid. Examples of such other liquids that can be used include chloroform, dichlorohexafluoropropane, benzotrifluoride, hexafluoroxylene and bromochloromethane. A particularly preferred mixture is about 20 to about 30 wt % chloroform and about 70 to about 80 wt % 3,4-dichlorobenzotrifluoride (3,4-DCBTF) because this mixture is very similar to carbon tetrachloride in physical properties and therefore few changes would have to be made in existing chlorine recovery systems. However, the losses of chloroform would be higher than the losses of carbon tetrachloride, although chloroform is not an ozone depleter.

Sufficient liquid should be used to absorb all of the chlorine that is present so that no chlorine is vented to the atmosphere. The solubility of chlorine in the chlorinated benzotrifluoride compounds of this invention is about 7½ wt % but saturation of the benzotrifluoride compound should be avoided. It is therefore preferable to use sufficient chlorinated benzotrifluoride compound so that its chlorine content is between about 20 and about 75 wt % of saturation. If the chlorine content exceeds 75 wt % of saturation, there is a danger of chlorine not being absorbed and leaving in the vented snift gas. If the amount of chlorinated benzotrifluoride-compound is less than 20 wt % of saturation, energy is wasted in heating the unnecessary chlorinated benzotrifluoride compound in the stripper.

The temperature at the bottom of the stripper is preferably the boiling point of the liquid while the temperature at the top of the stripper is preferably about ambient temperature. When a combination of chloroform and 3,4-DCBTF is used the top of the stripper should be cold (−4°C.) to prevent loss of chloroform. Thus, the liquid boils at the bottom of the stripper, but condensation of the liquid occurs as one moves up the stripper so that at the top of the stripper the vapors are almost entirely chlorine.

EXAMPLE

The following table gives a comparison of the properties of carbon tetrachloride with parachlorobenzotrifluoride (PCBTF), 3,4-dichlorobenzotrifluoride (3,4-DCBTF), and 3,4,5,-trichlorobenzotrifluoride (3,4,5-TCBTF).

|  | CCl4 | PCBTF | 3,4-DCBTF | 3,4,5-TCBTF |
|---|---|---|---|---|
| Specific Gravity | 1.59 | 1.34 | 1.47 | 1.58 |
| Flash Point, °C. | None | 43 | 77 | >93 |
| Freeze Point, °C. | −23 | −36 | −23 | −6 |
| Boiling Point, °C. | 74 | 139 | 174 | 209 |
| Viscosity CS | 0.61 | 0.67 | 0.77 (est.) | 0.77+ (est.) |

I claim:

1. A method of removing chlorine from a mixture of gases comprising
   (a) contacting said mixture of gases with a liquid which comprises a compound having the general formula

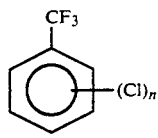

where n is 1 to 3, whereby chlorine in said mixture of gases is absorbed by said liquid; and
   (b) heating said liquid to volatilize said chlorine therefrom and separate said chlorine from said liquid.

2. A method according to claim 1 wherein said compound is parachlorobenzotrifluoride.

3. A method according to claim 1 wherein said compound is 3,4-dichlorobenzotrifluoride.

4. A method according to claim 1 wherein said compound is 3,4,5-trichlorobenzotrifluoride.

5. A method according to claim 1 wherein said compound is a mixture of about 20 to about 30 wt % chloroform and about 70 to about 80 wt % 3,4-dichlorobenzotrifluoride.

6. A method according to claim 1 wherein said heating is at the boiling point of said liquid.

7. A method according to claim 1 wherein said mixture of gases contains about 1 to about 45 wt % chlorine.

8. A method according to claim 1 wherein the amount of said liquid is sufficient so that, if all of said chlorine is absorbed by said liquid, the chlorine absorbed will be about 20 to about 75 wt % of saturation.

9. A method of removing chlorine from a mixture of gases containing about 1 to about 45 wt % chlorine comprising
   (a) passing said mixture of gases up through a column of inert material;
   (b) passing down through said column a liquid which comprises a compound having the general formula

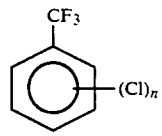

where n is 1 to 3, whereby chlorine in said mixture is absorbed by said liquid;
   (c) heating said liquid to its boiling point to volatilize chlorine therefrom; and
   (d) recycling said liquid to said column.

10. A method according to claim 9 wherein said compound is parachlorobenzotrifluoride.

11. A method according to claim 9 wherein said compound is 3,4-dichlorobenzotrifluoride.

12. A method according to claim 9 wherein said compound is 3,4,5-trichlorobenzotrifluoride.

13. A method according to claim 9 wherein said compound is a mixture of about 20 to about 30 wt % chloroform and about 70 to about 80 wt % 3,4-dichlorobenzotrifluoride.

* * * * *